Feb. 12, 1935.  O. A. ROSS  1,990,799
MAGNETIC CAR RETARDER
Filed Jan. 7, 1928   2 Sheets-Sheet 1

Feb. 12, 1935.　　　O. A. ROSS　　　1,990,799

MAGNETIC CAR RETARDER

Filed Jan. 7, 1928　　2 Sheets-Sheet 2

INVENTOR
Oscar A. Ross.
BY Neil A. Preston
his ATTORNEY

Patented Feb. 12, 1935

1,990,799

UNITED STATES PATENT OFFICE 1,990,799

MAGNETIC CAR RETARDER

Oscar A. Ross, New York, N. Y., assignor to General Railway Signal Company, Rochester, N. Y.

Application January 7, 1928, Serial No. 245,144

8 Claims. (Cl. 188—62)

This invention relates to car retarders and more particularly to a class thereof which it is chosen to term "magnetic car retarders".

In the making up freight trains in freight yards of large railway systems, it is customary to employ what is known as a "hump" over which the cars are switched: said hump producing the required acceleration for moving said cars to the particular train of cars to which they are to be coupled. It has also been the custom to have an attendant, or "brakeman" ride said cars for the purpose of applying brakes thereon to reduce their speed to prevent possible "damage" as said cars are coupled to said trains.

Another object is to retard the movement of freight cars or similar vehicles, by magnetically causing frictional engagement of the aforesaid track instrumentalities with the wheels of said cars, the magnetic circuit for causing said frictional engagement including said track instrumentalities and the wheels and axles of said cars.

Other objects and advantages will appear as the description of the invention progresses, and the novel features of the invention will be pointed out in the appended claims.

This invention comprises in the novel construction and arrangement of parts hereinafter described, delineated in the accompanying drawings, and particularly pointed out in that portion of the instrument wherein patentable novelty is claimed for certain and peculiar features of the invention, it being understood that, within the scope of what hereinafter thus is claimed, divers changes in the form, proportions, size and minor details of the device and system of control therefore may be made without departing from the spirit of, or sacrificing any of the details of the invention.

In describing the invention in detail, reference is had to the accompanying drawings wherein I have illustrated embodiments of my invention, and wherein like characters of reference designate corresponding parts throughout the several views, and in which:—

Fig. 4 is a side elevation of modified sector unit and friction plate, as viewed from the line IV—IV of Fig. 5; and Fig. 5 is a back view of the same unit, as viewed from the line V—V of Fig. 4.

Figure 1:
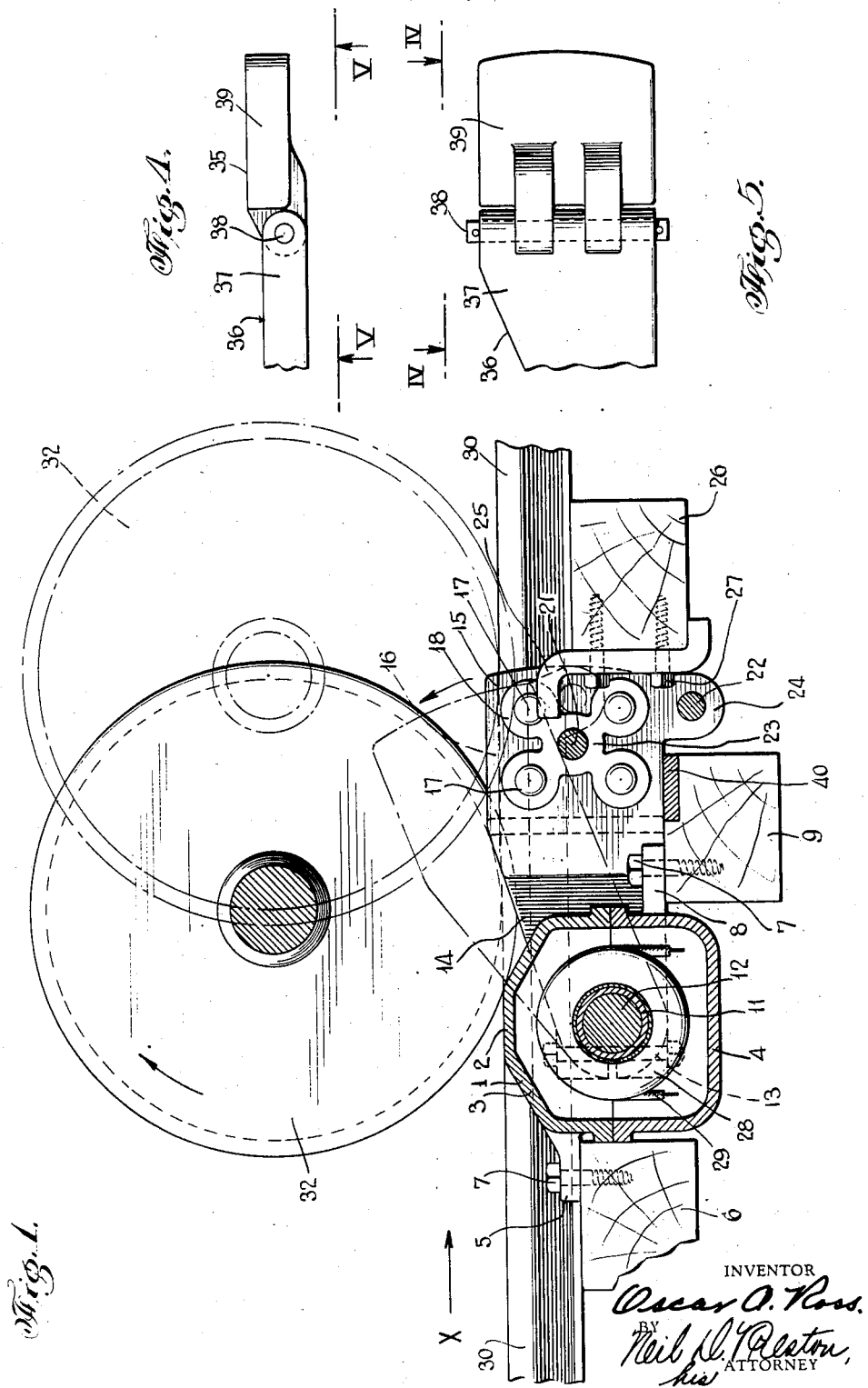
Fig. 1 is a side elevation of one embodiment of the invention showing certain parts in cross-section taken on line I—I of Fig. 3, as viewed in the direction of the arrows.
Figure 2:
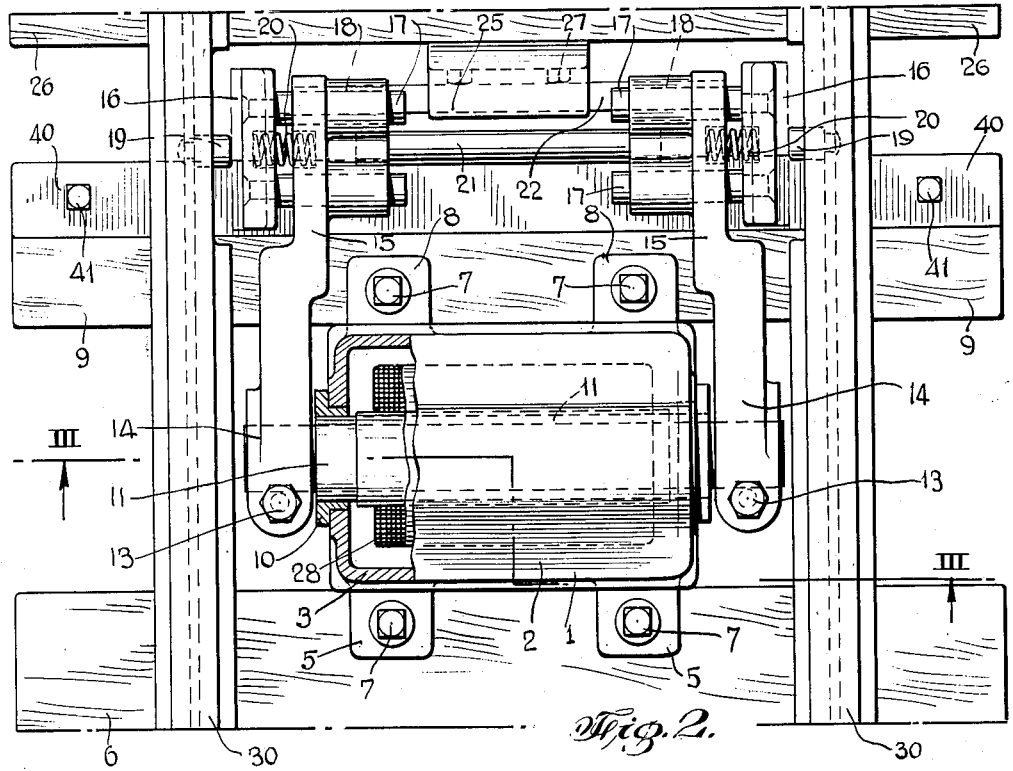
Fig. 2 is a plan view of the apparatus shown in Fig. 1 illustrating parts thereof in cross section on the line II—II of Fig. 3 as viewed in the direction of the arrows.
Figure 3:
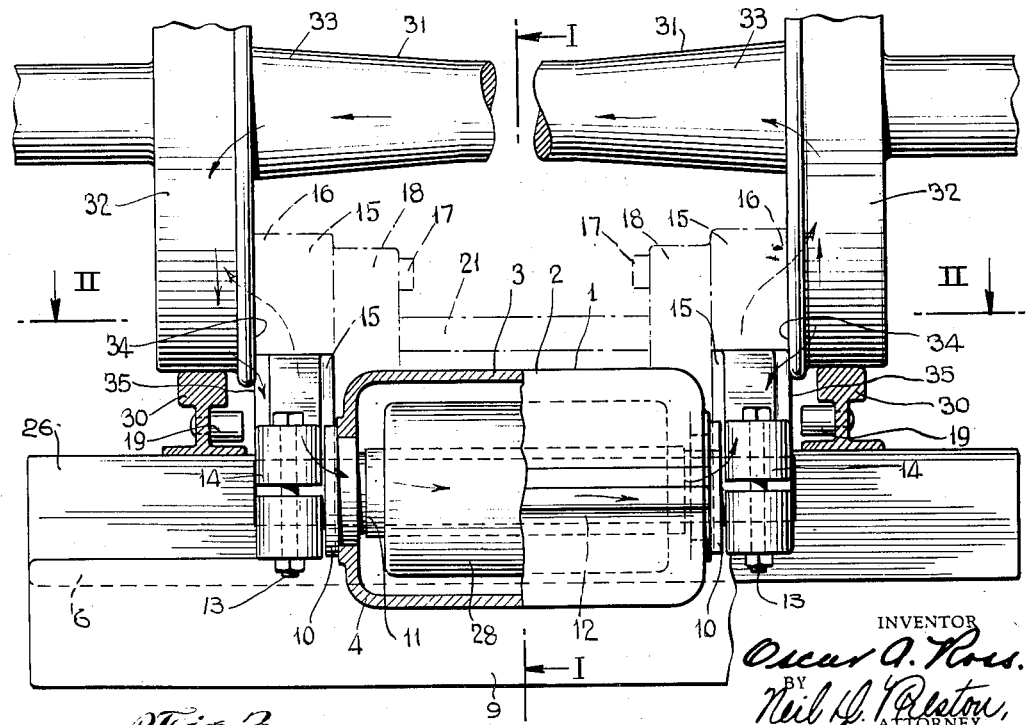
Fig. 3 is an elevation taken crosswise of the track and illustrating parts thereof in cross-section taken on the line III—III of Fig. 2, as viewed in the direction of the arrows.

Referring to Figs. 1, 2 and 3, the magnetism generating unit 1, hereinafter termed magnetic braking unit, comprises housing 2, the upper shell 3 of which is suitably bolted to the lower shell 4, said upper shell having supporting lugs 5—5 secured to tie 6 by bolts or lags 7—7, said lower shell having lugs 8—8, likewise secured to tie 9 by similar bolts or lags 7—7.

Clamped between said upper and lower shells are non-ferric bushings 10—10 rigidly secured to a non-ferric tube 11 acting as a bearing for magnetic core 12, to the polar ends of which are clamped, by bolts 13—13, two sector units 14—14, the sectors 15—15 which support friction brake plates or brake shoes 16—16 having studs 17—17 operating in bearings 18—18 formed in said sectors, said plates being normally biased away from said sectors and against stop pins 19—19 by springs 20—20.

Said sectors 15—15 are rigidly connected together by non-ferric rods 21 and 22 interposed therebetween, the ends of rod 21 being rigidly secured in bosses 23—23 of said sectors and rod 22 likewise rigidly secured in lugs 24—24 extending downwardly from said sectors. The mid-section of rod 22 is adapted to impinge on stop lug 25 secured to tie 26 by bolts, or lags 27—27.

Suitably secured to tube 11 is magnet coil 28 having terminals 29—29 adapted to receive energy as more fully described in the co-pending application for Letters Patent Ser. No. 245,141 filed January 7, 1928.

Track rails 30—30 suitably secured to ties, as 6 and 26 are adapted to act as carriers for car axles 31 comprising wheels 32—32 and axle 33, and the inner faces 34—34 of said wheels are adapted to frictionally engage with friction faces 35—35 of the friction plates, or brake shoes 16—16 as said wheels pass over said rails adjacent to said brake shoes.

Referring to Figs. 4 and 5, the modified sector unit 36 comprises sector 37, to which is hinged, by pin 38, the friction plate, or brake shoe 39 having friction face 35, adapted to similarly engage friction face 34 of wheel 32. Said sector unit 36 may be substituted for sector unit 14 if desired.

The operation is as follows:— referring to Figs. 1, 2 and 3, coil 28 is supplied with electrical energy as more fully described in the aforesaid copending application for Letters Patent, and as said coil is energized, and assuming that a car axle as 31 is present on rail 30, a magnetic flux path will be established as shown by the arrow shown in Fig. 3, and which comprises the following structure, magnet core 12, right hand sector 15, bearings 18—18, to studs 17—17 and to friction face 35 of brake shoe 16 causing said shoe to impinge on friction face 34 of right hand wheel 32, thence through said wheel, axle 33 and left hand wheel 32 to the friction face 34 thereof and thence to friction face 35 of left hand brake shoe 16, likewise causing said shoe to impinge on said wheel friction face, thence through said brake shoe, studs 17—17, bearings 18—18 and left hand sector 15 returning to core 28 as a complete ferric magnetic circuit.

It will be noted from the foregoing description that a complete ferric magnetic circuit without an air gap has been formed whereby a comparatively large volume of magnetic flux is generated in said path from a comparatively small current, and as the car axle 31 moves in the direction of arrow X (see Fig. 1), from the full line to the dotted line position, the sector units 14—14 will be raised to the dotted position shown, and, as said movement obtains the friction faces 35—35 of brake shoes 16—16 which frictionally contact with friction faces 34—34 of wheels 32—32, will cause a much higher braking effect to be produced than if these sector units 14—14 were not permitted to assume the raised position.

As said car axle 31 moves in direction of arrow X and prior to its wheels contacting with sector units 14—14, the brake shoes 16—16 normally impinge on stops 19—19. As said wheels contact with said shoes, said shoes are forced inwardly away from said stops as the friction faces 35 thereof frictionally engage with friction faces 34 of wheels 32—32, and, after said wheels have moved in the direction of arrow X to a point beyond the sector units 14—14, said units fall by gravity to the stop 40 as shown by the full line position, and, as another car axle, as 31 approaches magnetic braking unit 1, said sector units 14—14 are again frictionally engaged with the wheels of said axle and causes further retardation of said axle and the car or vehicle which it normally supports.

In this connection, it should be remembered that the brake rigging on freight cars extends so low on car trucks that trackway brakes ordinarily are not permitted to extend above the lever of track rails more than a few inches. The present invention, however, contemplates the use of pivotally mounted braking arms or sector units 14—14, which are pivoted in vertical planes and are permitted to rise as the wheel has advanced to a point where the engaging surface of the wheel is moved upwardly, that is, when the brake shoe engages the rear part of the wheel. It is of course understood that this facility of allowing the brake shoe to rise increases the lever arm through which the braking acts and thereby increases the actual braking. In other words, when the car wheel first enters the brake shoe embodying the present invention the car wheels are braked at a comparatively low rate by reason of the short leverage through which the brake shoes may act, but as the car wheel is just about to pass out of the braking surface the brake shoes are raised thus increasing the leverage and the braking effect.

It is obvious that a number of magnetic braking units, as 1 may be placed adjacent each other in this manner, either successively, or jointly engaging all the car wheels of a car or number of cars which may be switched into a car retarding zone as more fully described in the aforesaid copending application for Letters Patent.

What I claim is:—

1. A car retarder of the electro-magnetic type comprising, a track rail, a car wheel of magnetic material movable over said track rail, a member pivotally supported for movement in a vertical plane parallel to said track rail and so located that its free end can engage a side of said car wheel, and a coil for producing magnetic flux in a magnetic circuit including said member and said car wheel in series.

2. A car retarder of the electro-magnetic type comprising, a track rail, a car wheel of magnetic material movable over said track rail, a member pivotally supported for movement in a vertical plane parallel to said track rail and so located that its free end can engage a side of said car wheel, a coil for producing magnetic flux in a magnetic circuit including said member and said car wheel in series, said member projecting in the same direction from the pivotal support as the direction of car travel over said track, whereby the free end of said brake shoe when magnetically pressed against the side of said car wheel is lifted as the car wheel is rotated and thereby increases the effective lever arm for retarding said car wheel.

3. A car retarder of the electro-magnetic type comprising, a track rail of magnetic material, a car wheel of magnetic material movable over said track rail, a brake member pivotally supported for movement in a vertical plane parallel to said track rail and so located that its free end may engage the side of said car wheel, a coil for producing magnetic flux in a magnetic circuit including said member and said car wheel in series, the free end of said brake member when magnetically pressed against the side of said car wheel being arranged to be lifted as the car wheel is rotated and thereby to increase the effective lever arm for retarding said car wheel.

4. A car retarder of the electro-magnetic type comprising, a pair of track rails, a car axle and associated car wheels of magnetic material movable over said track, a shaft of magnetic material extending cross-wise of the track and pivotally supported, a coil on said shaft, a member of magnetic material at each end of said shaft, brake shoes of magnetic material movably connected to the free ends of said members, and means for energizing said coil.

5. A car retarder of the electro-magnetic type comprising, a pair of track rails, a car axle and associated car wheels of magnetic material movable over said track, a casing disposed between the track rails, a shaft of magnetic material in said casing extending cross-wise of the track and pivotally supported in said casing, a coil on said shaft within said casing, a member of magnetic material on each end of said shaft, brake shoes of magnetic material movably connected to the free ends of said members, and means for energizing said coil, whereby said brake shoes frictionally engage the sides of moving car wheels when said coil is energized and whereby the point of engagement of said brake shoes with said car wheel is raised above the top of the track rails as the car wheel moves by said brake shoe.

6. A car retarder of the electro-magnetic type comprising, a pair of track rails, a car axle and associated car wheels of magnetic material movable over said track, a casing disposed between between the track rails, a shaft of magnetic material in said casing extending cross-wise of the track and pivotally supported in said casing, a coil on said shaft within said casing, a member of magnetic material at each end of said shaft, brake shoes of magnetic material movably connected to the free ends of said members, means for energizing said coil to produce magnetic flux in said brake shoes, wheels, and axle, and spring means for urging said brake shoes against the sides of passing wheels.

7. In a car retarder, for use with a track rail, a braking arm supported adjacent the track rail in a manner to be engageable by a car wheel and to rotate in a vertical plane and about an axis cross-wise of the track rail, and means for changing the point of engagement of said brake arm and car wheel, whereby said braking arm may lift an appreciable distance above the top of the rails and thereby increase its braking effort without interfering with the car carried brake rigging.

8. In a car retarder of the track brake type, for use with a track rail and the car wheels of a passing car, an articulated braking arm supported adjacent the track rail in position to be engaged by the wheels of a passing car and be thereby moved upwardly to change the point of engagement on the wheel as the wheel passes, and stop means preventing the brake arm from moving so far upwardly as to pass outside of proper clearance limits.

OSCAR A. ROSS.